United States Patent [19]

Brodersen

[11] Patent Number: 5,720,462
[45] Date of Patent: Feb. 24, 1998

[54] ROTATABLE AND FORE-AFT SLIDABLE SEAT MOUNT AND CONTROLS

[75] Inventor: Cole T. Brodersen, Davenport, Iowa

[73] Assignee: Sears Manufacturing Company, Davenport, Iowa

[21] Appl. No.: 412,330

[22] Filed: Mar. 31, 1995

[51] Int. Cl.$^6$ .............................. F16M 13/00; A47C 3/18
[52] U.S. Cl. ................. 248/425; 248/429; 297/344.24; 297/344.21; 297/311
[58] Field of Search ...................... 248/424, 425, 248/429, 430; 297/337, 311, 344.11, 344.21, 344.22, 344.24, 344.26

[56] References Cited

U.S. PATENT DOCUMENTS

| | | |
|---|---|---|
| 4,093,197 | 6/1978 | Carter et al. . |
| 4,183,493 | 1/1980 | Koutsky . |
| 4,241,893 | 12/1980 | Koutsky et al. . |
| 4,344,597 | 8/1982 | Eimen .................... 248/429 X |
| 4,455,009 | 6/1984 | Foster et al. . |
| 4,570,997 | 2/1986 | Tanizaki et al. ............. 248/425 X |
| 4,834,452 | 5/1989 | Goodrich . |
| 5,042,864 | 8/1991 | Mochizuki ................. 248/425 |
| 5,106,144 | 4/1992 | Hayakawa et al. ........... 248/429 X |
| 5,161,765 | 11/1992 | Wilson . |
| 5,234,189 | 8/1993 | Myers ....................... 248/429 |
| 5,292,179 | 3/1994 | Forget ...................... 297/344.24 |
| 5,516,071 | 5/1996 | Miyauchi ................... 248/429 |

*Primary Examiner*—Lanna Mai
*Assistant Examiner*—Winnie S. Yip
*Attorney, Agent, or Firm*—Niro, Scavone, Haller & Niro

[57] ABSTRACT

A rotatable and slidable seat mount which has controls for rotation and for sliding which may be independently operated and which may be operated from actuators fixed to the same location relative to the seat from any rotational or lateral orientation.

8 Claims, 2 Drawing Sheets

ROTATABLE AND FORE-AFT SLIDABLE SEAT MOUNT AND CONTROLS

BACKGROUND OF THE INVENTION

The present invention relates generally to a seat support assembly and, more particularly, to a vehicle seat support which further provides for easy and convenient rotational and fore-aft adjustment by allowing the rotational and fore-aft adjustment actuation handles to travel with the seat rotationally and linearly.

Many special service vehicles require seats that permit an operator or passenger to rotate in any direction. For instance, the operator of heavy equipment, like a backhoe, needs to be able to operate the vehicle in many different directional orientations. In such vehicles, it is beneficial if the operator can adjust the fore and aft displacement of the seat from any possible rotational orientation, as well.

The present invention provides an easy-to-use, safe, mechanical device for allowing a seat occupant to slide the seat fore and aft from any rotational direction by allowing the rotational and fore-aft displacement actuation handles to travel with the seat rotationally and linearly.

SUMMARY OF THE INVENTION

A primary object of the present invention is to provide a seat support assembly which allows seat rotational adjustment and fore-aft adjustment and which also allows the adjustment handles or actuators to travel with the seat. The present invention, thus, allows a seat occupant to simultaneously or independently adjust the seat rotationally and/or linearly and further makes such adjustment convenient by providing adjustment control handles that travel with the seat. The present invention thereby allows a seat occupant to adjust the seat rotationally and linearly with one hand and frees up the other hand to operate the vehicle.

Therefore, according to the present invention, a seat mounting apparatus is provided comprising a base with slide tracks, a slide support slidably mounted on the base with a pivotal latch which engages and disengages the slide tracks, and a rotational support rotatably mounted on the slide support which carries the seat and the slide and rotational actuators such that the actuators travel rotationally and slidably with the seat to rotate or slide the seat from any linear or rotational orientation.

DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DESCRIPTION OF THE PREFERRED EMBODIMENTS

Figure 1:
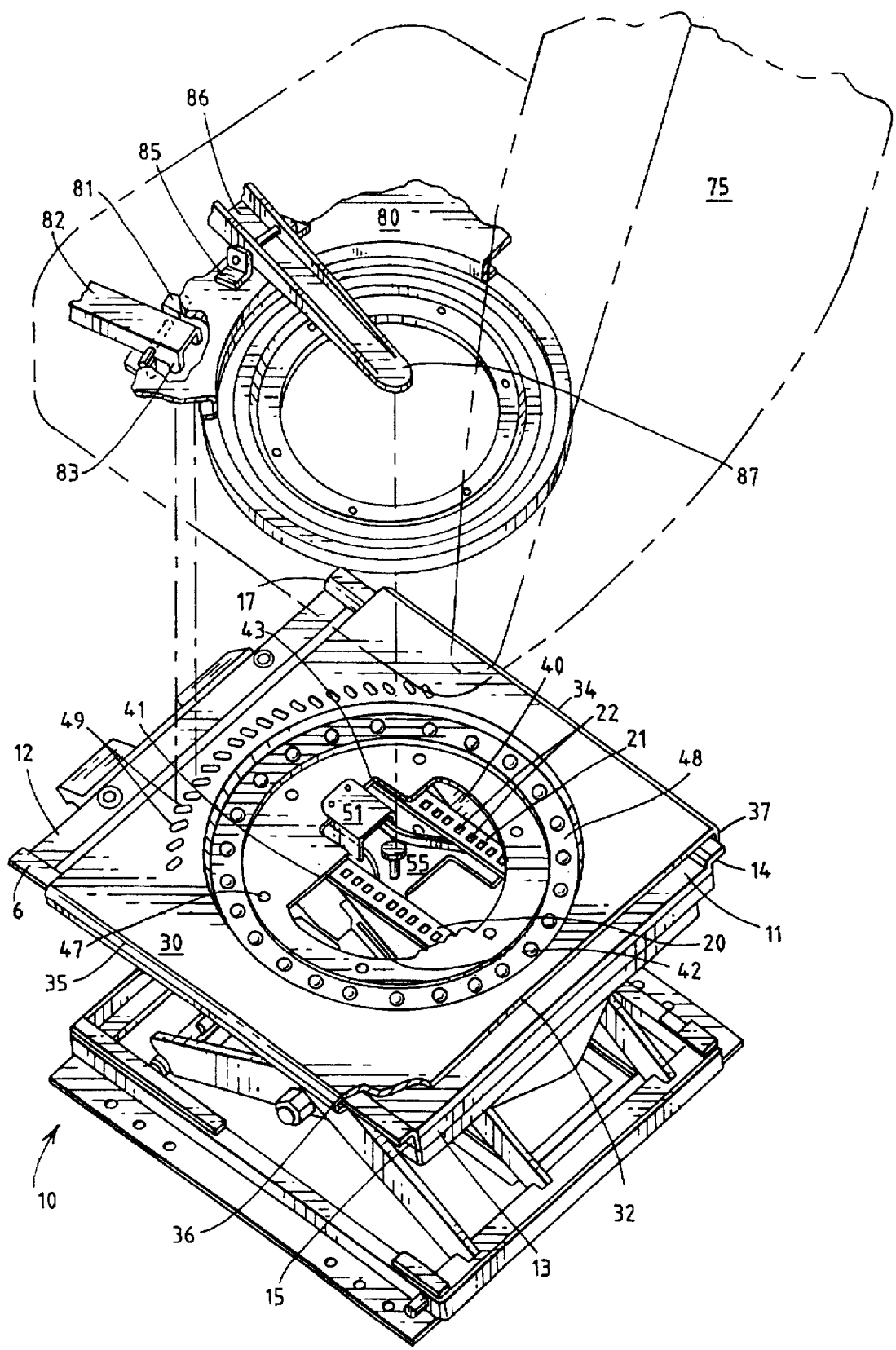
FIG. 1 is an exploded perspective view of the present invention.

The preferred embodiment of the seat support assembly of the present invention, as shown in FIG. 1 and designated generally 10, utilizes a base 11, a slide support 30 and a rotational support 80. Base 11 may be fixedly secured to a vehicle or may be incorporated into a vehicle as part of a seat suspension like that disclosed in U.S. Pat. No. 4,093,197. Slide support 30 is slidably mounted on base 11, and rotational support 80, to which a seat is attached, is rotatably mounted to slide support 30. The slide and swivel adjustment handles are pivotally carried by the rotational support. Therefore, as the seat is adjusted rotatably and linearly, the adjustment handles remain with the seat for convenient adjustment.

Base 11 is a rigid frame, having a front 12 and a rear 13 corresponding to the fore and aft of the vehicle. Sides 14, 15 of the base are parallel to the slide path of the seat. Fixedly attached between front 12 and rear 13 of base 11 and raised vertically slightly from base 11 are two parallel slide latch tracks 20, 21 with spaced holes 22. Slide latch tracks 20, 21 define a slide path and work to allow or prohibit linear seat adjustment as described below.

Side edges 14, 15 of base 11 are upwardly flanged in an inverted L-shape cross-section. Flanges 16, 17 protrude upward from the plane of base 11 and turn outward, forming top portions 18, 19 which form a plane parallel to the plane of base 11. Flange top portions 18, 19 are above the plane of base 11 and above the level of slide latch tracks 20, 21. As described below, flanges 16, 17 allow slide plate 30 to be slidably mounted to base 11.

Slide support 30 is above and slidably engages base 11. Slide support 30 is substantially flat and rectangular, having front and rear edges 32, 33 and side edges 34, 35. Front and rear edges 32, 33 correspond to the fore and aft of the vehicle. Side edges 34, 35 are parallel to the seat slide direction and include depending flanges 36, 37, substantially C-shaped in cross-section. To facilitate the ability to slide relative to base 11, top portions 18, 19 of the inverted-L flanges nest within flanges 36, 37. Thus, base 11 and slide support 30 may slide fore and aft relative to one another but not in any other horizontal or vertical direction. While this means for slidably mounting slide support 30 to base 11 is preferred, a variety of means exist to accomplish the same function which are well known to those of ordinary skill in the art. See, e.g., U.S. Pat. No. 4,183,493.

Slide support 30 also has central aperture 40. Central aperture 40 is substantially in the shape of a semi-circle with straight edge 41 toward the front of slide support 30 and semi-circular periphery 42 disposed toward the rear of slide support 30. A portion of front edge 41 of aperture 40 is further cut away in the form of a rectangle. The most forward edge of the aperture is, therefore, front edge 43 of the rectangular peninsular cut-away. Edge 43 is the central aperture mounting edge as described below. Arranged around aperture 40 is circular track 48. In circular track 48 are ball bearings or other suitable means to facilitate rotation of rotational support 80. Arranged circumferentially around circular track 48 are spaced rotational adjustment holes 49. Between central aperture 40 and circular track 48 are a plurality of circumferentially spaced rotational support attachment holes 47 to mount rotational support 80 to seat 75.

Figure 2:
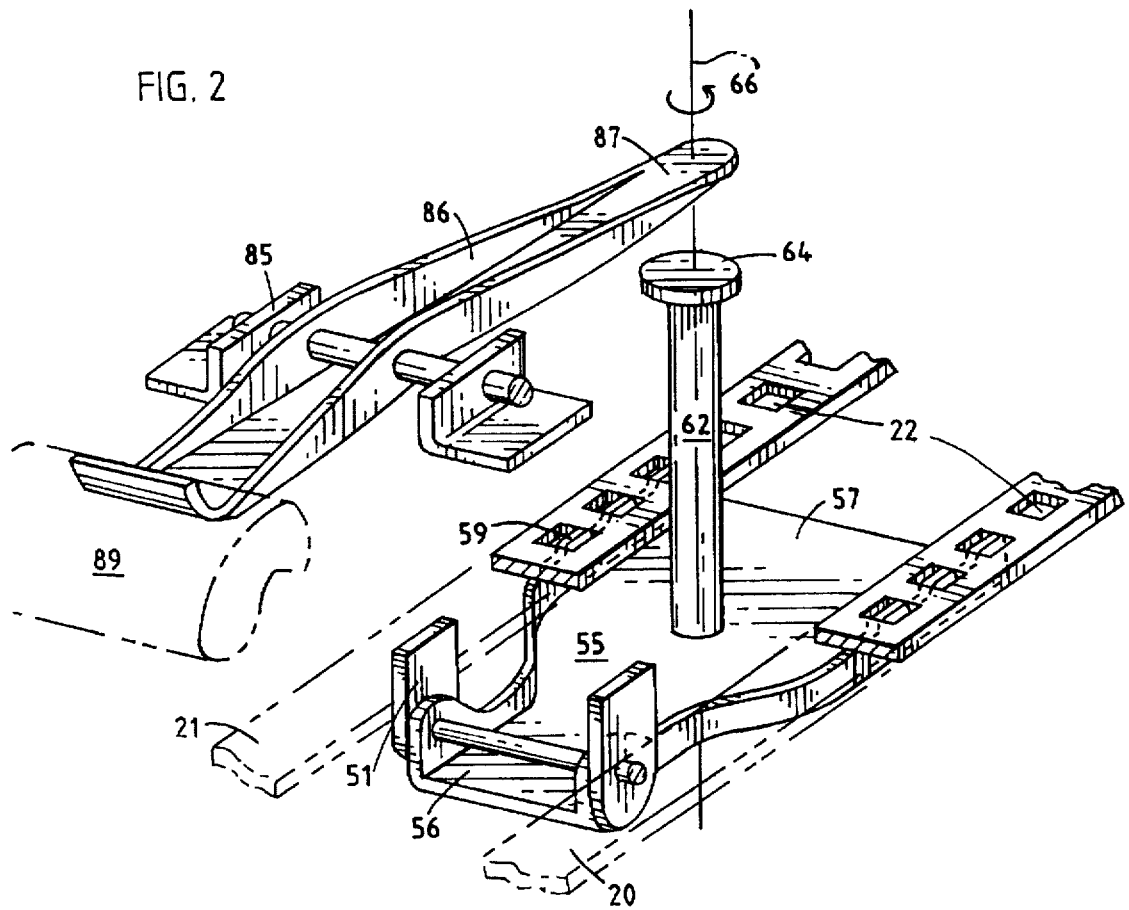
FIG. 2 is an exploded view of portions of the slide actuator and slide latch of the present invention.
Figure 3:
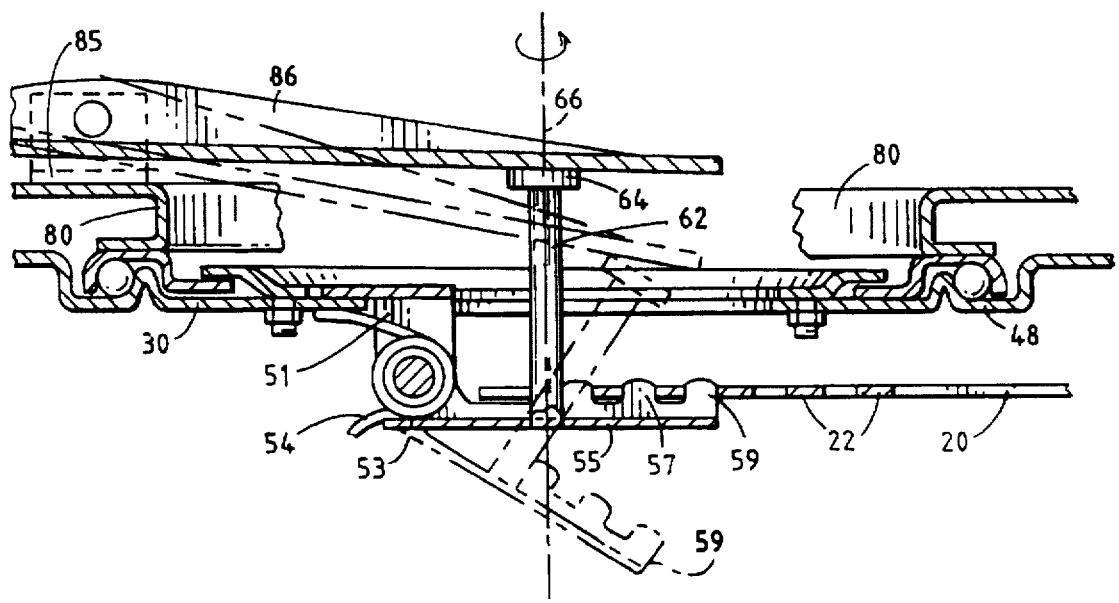
FIG. 3 is a cross-sectional view of the slide support, rotational support, slide actuator arm and slide latch of the present invention.

Attached pivotally to mounting edge 43 of central aperture 40 is a depending U-shaped bracket 51, illustrated most clearly in FIGS. 2 and 3. Pivotally attached via pivot pin 53 between the fingers of U-shaped bracket 51 is slide latch 55. Slide latch 55 includes a neck 56 and body 57. Body 57 of slide latch 55 is disposed below slide latch tracks 20, 21 and has two parallel rows of upwardly facing teeth 59 to engage in holes 22 of slide latch tracks 20, 21. Neck 56 is attached pivotally to U-shaped bracket 51 depending from slide support 30. A coil spring 54 mounted with latch 55 acts to bias latch teeth 59 upwardly and in engagement with slide track holes 22. Slide latch 55 travels with slide support 30.

Slide latch 55 includes in substantially the center of its body 57 a vertically upstanding slide latch actuator plunger 62. Plunger 62 has head 64 which terminates at a vertical level above the plane of slide support 30 (see FIG. 3). Plunger 62 is disposed on the rotational axis 66 of seat 75. Thus, as seat 75 rotates, plunger 62 remains essentially stationary.

Rotational support 80 is rotatably mounted above slide support 30. Various means exist for rotatably securing rotational support 80 to slide support 30 which are well known to those of ordinary skill the art and will not be specifically described here. Attached to rotational support 80 are rotation actuation mount 81 and slide actuation mount 85. Rotation actuation arm 82 is attached to rotation actuation mount 81. A rotation actuation handle (not shown) is attached to the front of rotation actuation arm 82. Slide actuation arm 86 is pivotally mounted to slide actuation mount 85. Slide actuation handle 87 (shown in FIG. 2) is attached to the front of slide actuation arm 86.

Rotation actuation arm 82 includes rotation node 83. Rotation node 83 is spring-biased downwardly to engage the circularly spaced apertures 49 of slide support 30. When inserted into an aperture 49 of slide support 30, rotation node 83 prevents rotation. The rotation actuator handle (net shown) on rotation actuator arm 82 works to move node 83 out of its aperture 49 and thus allows rotation. Releasing the rotation actuator handle (not shown) causes rotation node 83 to re-engage aperture 49 of slide support 30 and, thus, prevent further rotation. Slide actuator arm 86 and handle 89 travel with seat bottom support 80.

Rear portion 87 of slide actuator arm 86 terminates at the rotational axis 66 and thus, directly over slide latch actuator plunger 62. Lifting slide actuator handle 89 causes slide actuator arm 86 to engage and push down slide latch plunger 62 which forces down slide latch 55. Pushing down slide latch 55 causes slide latch teeth 59 to disengage from holes 22 of slide latch tracks 20, 21. When slide latch teeth 59 are disengaged from holes 22 of slide latch tracks 20, 21, seat 75 is free t9 slide linearly fore and aft. Releasing slide actuator handle 89 allows slide latch teeth 59 to rise and re-engage with slide latch tracks 20, 21, and thus prevent further sliding.

Rear portion 87 of slide actuator arm 86 is continuously disposed above slide latch plunger 62 because slide latch plunger 62 slides with seat bottom support 80 and rear portion 87 of slide actuator arm 86 is located over axis of rotation 66 which coincides with slide latch plunger 62 and, thus, maintains its position at all times relative to seat bottom support 80 and slide actuator arm 86. Therefore, the seat occupant can slide seat 75 both fore and aft from any rotational direction.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

What is claimed is:

1. A seat mounting apparatus, comprising:

a base;

a slide support slidably mounted on the base to permit linear reciprocal movement of the slide support relative to the base;

a rotational support mounted on the slide support to permit rotational movement relative to the slide support;

a seat mounted to the rotational support;

a latch mounted to the slide support in operative association with the base and the slide support to lock the slide support in one of a plurality of linear positions relative to the base, the latch including a latch element movable between a latch-engaged position and a latch-disengaged position;

a latch release mechanism mounted on the rotational support and actuatable to move the latch element from the latch-engaged position to the latch-disengage a position independently of the rotational orientation of the rotational support relative to the slide support.

2. The seat mounting apparatus of claim 1 further comprising:

the base having front, rear and two sides and having inverted L-shaped flanges extending upward from either side, the flanges having top sections extending outward and being substantially parallel to the plane of the base;

the slide support having front, rear and two sides and having depending C-shaped flanges directed inward on either side, the openings of the flanges surrounding the top sections of the base flanges to facilitate the slide support sliding relative to the base.

3. The seat mounting apparatus of claim 1, wherein the base has two spaced parallel slide latch tracks extending from front to rear, the tracks having spaced holes along their length, and the latch element has vertically oriented teeth to selectively engage and disengage from the track holes.

4. The seat mounting apparatus of claim 1, wherein the latch includes a vertically extending plunger disposed in the axis of seat rotation; and the latch release mechanism is disposed over the plunger to act on the plunger and disengage the latch.

5. A seat mounting apparatus, comprising:

a base;

a slide support slidably mounted on the base to permit linear reciprocal movement of the slide support relative to the base;

a rotational support mounted on the slide support to permit rotational movement relative to the slide support;

a seat mounted to the rotational support;

a latch mounted to the slide support in operative association with the base and the slide support to lock the slide support in one of a plurality of linear positions relative to the base, the latch including a latch element movable between a latch-engaged position and a latch-disengaged position;

a latch release mechanism mounted on the rotational support and actuatable to move the latch element from the latch-engaged position to the latch-disengaged position independently of the rotational orientation of the rotational support relative to the slide support;

the latch having a vertically extending plunger disposed in the axis of seat rotation; and the latch release mechanism being disposed over the plunger to push down on the plunger and disengage the latch.

6. A slidable, rotatable seat mounting apparatus comprising:

a base having front and rear and having at least one latch track extending from front to rear of the base, the track having a plurality of holes and defining a slide path;

a slide support slidably mounted to the base having a central aperture, a plurality of circularly arranged holes around the central aperture, and a latch pivotally attached to an edge of the central aperture, the latch having a plurality of teeth disposed to releasably engage the latch track holes, and a central plunger extending vertically from the latch in the axis of seat rotation; and a rotational support rotatably mounted on the slide support having a pivotally mounted slide actuator and a pivotally mounted rotational actuator, the slide actuator having a handle located near the front of the rotational support and an arm extending back and terminating over the plunger such that when the seat rotates the arm remains at all times over the plunger and lifting the slide actuator handle pushes down the plunger, and the rotational actuator having a handle located near the front of the rotational support and an arm extending back and having a depending pin to engage a hole of the slide support such that operating the rotational actuator handle disengages the pin from the hole and allows seat rotation.

7. A seat mounting apparatus, comprising:

a base;

a slide support slidably mounted on the base to permit linear reciprocal movement of the slide support relative to the base;

a rotational support mounted on the slide support to permit rotational movement to any position relative to the slide support;

a seat mounted to the rotational support;

a latch mounted to the slide support in operative association with the base and the slide support to lock the slide support in one of a plurality of linear positions relative to the base, the latch including a latch element movable between a latch-engaged position and a latch-disengaged position; and a latch release mechanism mounted on the rotational support and actuatable to move the latch element from the latch-engaged position to the latch-disengaged position independently of the rotational orientation of the rotational support relative to the slide support.

8. A seat mounting apparatus, comprising:

a base;

a slide support slidably mounted on the base to permit linear reciprocal movement of the slide support relative to the base;

a rotational support mounted on the slide support to permit rotational movement to any position relative to the slide support;

a seat mounted to the rotational support;

a latch mounted to the slide support in operative association with the base and the slide support to lock the slide support in any one of a plurality of linear positions relative to the base, the latch including a latch element movable between a latch-engaged position and a latch-disengaged position and a vertically extending plunger disposed in the axis of seat rotation; and a latch release mechanism mounted on the rotational support and disposed over said plunger to act on the plunger to move the latch element from the latch-engaged position to the latch-disengaged position independently of the rotational orientation of the rotational support relative to the slide support.

* * * * *

UNITED STATES PATENT AND TRADEMARK OFFICE
CERTIFICATE OF CORRECTION

PATENT NO.  : 5,720,462
DATED       : February 24, 1998
INVENTOR(S) : Cole T. Brodersen It is certified that error appears in the above-identified patent and that said Letters Patent is hereby corrected as shown below:

Column 4, line 20, delete "latch-disengage a" and insert -- latch-disengaged--

Signed and Sealed this

Twenty-eighth Day of April, 1998

Attest:

BRUCE LEHMAN

Attesting Officer

Commissioner of Patents and Trademarks